(12) United States Patent
Falinower

(10) Patent No.: US 7,651,565 B2
(45) Date of Patent: Jan. 26, 2010

(54) DEVICE FOR DRYING AND/OR CALCINING GYPSUM

(75) Inventor: Charles Falinower, Carpentras (FR)

(73) Assignee: Lafarge Platres, Avignon Cedex (FR)

(*) Notice: Subject to any disclaimer, the term of this patent is extended or adjusted under 35 U.S.C. 154(b) by 790 days.

(21) Appl. No.: 10/506,567

(22) PCT Filed: Mar. 4, 2003

(86) PCT No.: PCT/FR03/00692

§ 371 (c)(1),
(2), (4) Date: Aug. 12, 2005

(87) PCT Pub. No.: WO03/076356

PCT Pub. Date: Sep. 18, 2003

(65) Prior Publication Data

US 2006/0010711 A1    Jan. 19, 2006

(30) Foreign Application Priority Data

Mar. 8, 2002    (FR) ................. 02 02955

(51) Int. Cl.
C04B 28/14    (2006.01)
C04B 11/00    (2006.01)

(52) U.S. Cl. .................. 106/772; 422/139; 422/146; 110/245; 110/267; 110/282; 432/58

(58) Field of Classification Search ................ 106/772; 422/139, 146; 110/245, 267, 282; 432/58
See application file for complete search history.

(56) References Cited

U.S. PATENT DOCUMENTS

| 3,329,417 A | | 7/1967 | Ruble |
| 4,101,630 A | | 7/1978 | Stiling |
| 4,919,613 A | * | 4/1990 | Watkins ................ 432/58 |
| 5,013,237 A | | 5/1991 | Bergounhon |
| 6,054,101 A | * | 4/2000 | Langfeldt et al. ........... 422/142 |

FOREIGN PATENT DOCUMENTS

| CL | 33359 | 3/1983 |
| EP | 0 083 549 | 7/1983 |

(Continued)

OTHER PUBLICATIONS

Syndicat National Des Industries Du Platre: "Le Platre, Physico-chimie, Fabrication et Emplois", 1982, Eyrolles, Paris, FR, pp. 200-209.

(Continued)

Primary Examiner—Paul Marcantoni
(74) Attorney, Agent, or Firm—Buchanan Ingersoll & Rooney PC

(57) ABSTRACT

A gypsum dryer/calciner (1) includes a calcining space (2), a first pipe (4) exhibiting an inlet connected to a source of hot gases (3) and an outlet emerging in the calcining space (2); a second pipe (5) exhibiting an inlet connected to a source of gypsum (8) and an outlet emerging in the calcining space, the second pipe being concentric with the first pipe; a force-feeding screw (6) positioned at least partially in the second pipe, the said screw carrying the gypsum along in the calcining space. A process for calcining gypsum and to the plaster capable of being obtained by this process.

17 Claims, 2 Drawing Sheets

FOREIGN PATENT DOCUMENTS

| | | |
|---|---|---|
| EP | 0 230 793 | 8/1987 |
| EP | 0 284 464 B1 | 9/1992 |
| FR | 2 311 764 | 12/1976 |
| FR | 2 493 826 | 5/1982 |
| SU | 91532 | 1/1951 |

OTHER PUBLICATIONS

Official Action issued by the Russian Patent Office in the corresponding Russian application, Sep. 28, 2006, Moscow, RU, and English-language translation thereof.

Butt et al., "*Technology of binders*", Supreme School edition, 1965, pp. 25, 26, 31, 32, Moscow, SU (with attached Russian Patent Examiner's comments).

Boudnikov, P.P., et al., "*Gypsum, researches and uses*", Stroyizdat, 1943, pp. 36-38, Moscow, SU (with attached Russian Patent Examiner's comments).

Materials Dictionary (Chemical Industry Publishing Company, 1994, p. 868.

\* cited by examiner

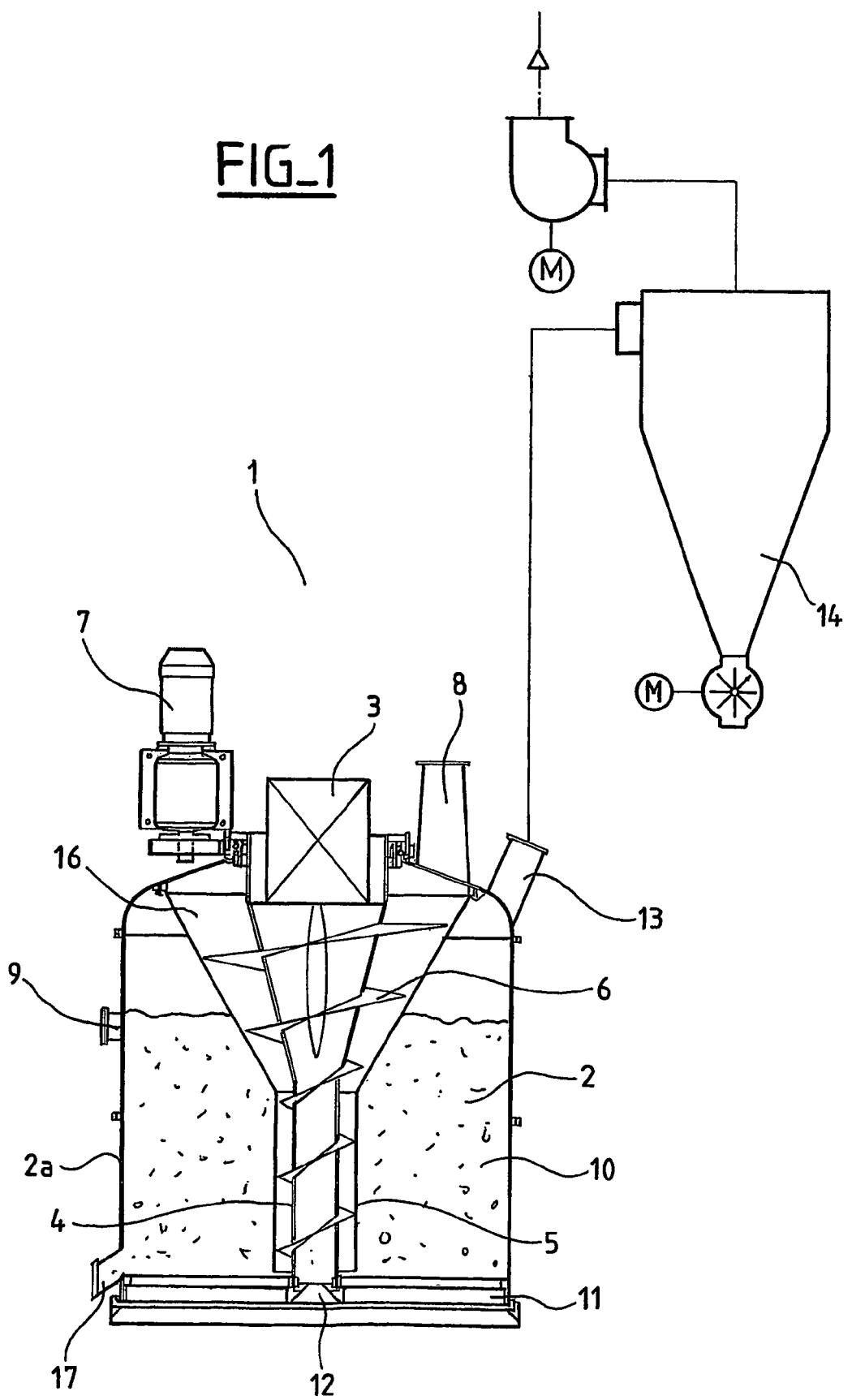
FIG_1

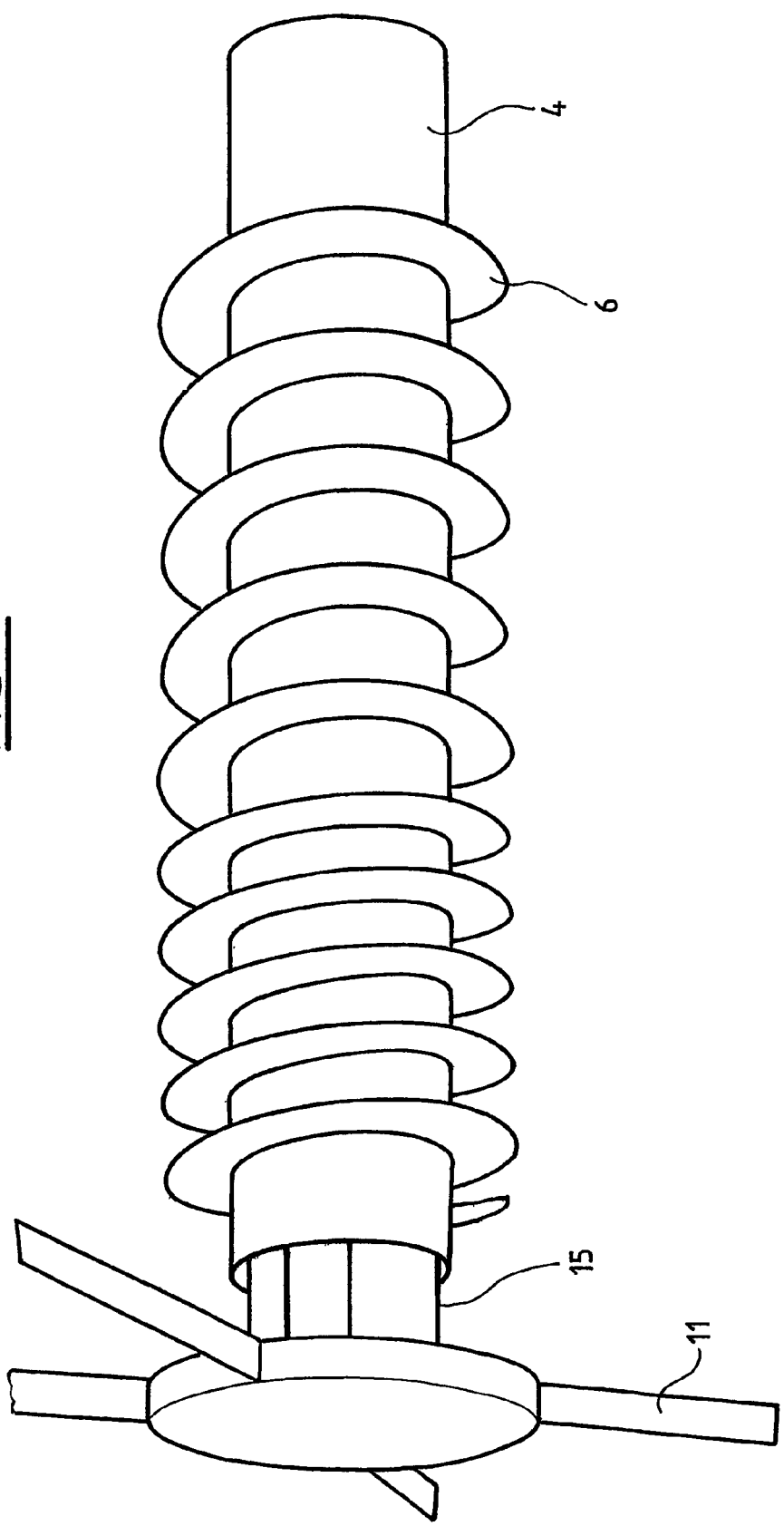
FIG_2

DEVICE FOR DRYING AND/OR CALCINING GYPSUM

BACKGROUND OF THE INVENTION

The present invention relates to a calcining device and in particular to a device for calcining calcium sulphate dihydrate (gypsum) to calcium sulphate hemihydrate (plaster).

The document FR-A-2 493 826 discloses a process for calcining gypsum in which a bed of gypsum is heated by direct introduction of hot gas and is maintained at a temperature appropriate for the production of calcium sulphate hemihydrate, water being sprayed into the hot gases before the latter come into contact with the gypsum.

The document EP-A-230 793 discloses a process and a device for calcining calcium sulphate dihydrate. In this document, combustion gases are introduced directly via a first tube extending downwards into a bed of material to be calcined. The very hot combustion gases are cooled before coming into contact with the material of the bed to be calcined. For this, cooler recycling gases, gypsum or both are introduced into a second tube partially surrounding the first tube, thus absorbing a portion of the heat of the hot gases by conduction through the wall of the first tube. The gypsum comes into contact with the material of the bed before coming into contact with the hot gases.

There are disadvantages to this device. The gypsum introduced between the two tubes has a tendency to build up on the tubes and to become clogged, thus blocking the calcining device. This problem is particularly significant when the material to be calcined is synthetic gypsum, for example gypsum from flue gas desulphurization.

The calcining device disclosed in the document EP-A-0 284 464 comprises a first tube for introducing hot air into the material of a bed to be calcined. This first tube is surrounded by a second tube. Fresh material to be calcined passes through the intermediate space between the first tube and the second tube. Baffles are placed between the first tube and the second tube in the path of the fresh material.

There are disadvantages to this device. This device requires pre-drying of the gypsum before it is introduced into the calcining device, in order to prevent clogging. In addition, this device requires crushed natural gypsum which has to be milled at the outlet of the furnace; this device is therefore not appropriate for gypsum from flue gas desulphurization, and synthetic gypsums more generally.

These devices also have disadvantages in common. The dehydration of the gypsum is insufficient and nonhomogeneous. In addition, the thermal efficiency of these devices is reduced. Furthermore, the excess pressure inside these devices requires safety measures and additional equipment, such as booster pumps, with high installation and maintenance costs. Generally, the times for calcining the gypsum in these plants are high, resulting in low throughputs in comparison with their size and a low reactivity of the hemihydrate obtained.

OBJECTS AND SUMMARY

It is thus an object of the invention to provide a solution to one or more of these disadvantages.

The invention thus relates to a gypsum dryer/calciner comprising:
  a calcining space;
  a first pipe exhibiting an inlet connected to a source of hot gases and an outlet emerging in the calcining space;
  a second pipe exhibiting an inlet connected to a source of gypsum and an outlet emerging in the calcining space, the second pipe being concentric with the first pipe;
  a force-feeding screw positioned at least partially in the second pipe, the said screw carrying the gypsum along in the calcining space.

According to one embodiment, the second pipe surrounds the first pipe over a portion of its length.

According to one embodiment, the second pipe surrounds the first pipe over substantially its length.

According to one embodiment, the calcining space corresponds to a receptacle at least partially surrounding the first pipe and the second pipe.

According to one embodiment, the calcining space is at least partially coincident with the inside of the second pipe.

According to one embodiment, the calcining space is divided up between the inside of the second pipe and the receptacle.

According to one embodiment, the calcining space is coincident with the inside of the second pipe.

According to one embodiment, the first pipe is emplaced so as to rotate with respect to the second pipe and drives the force-feeding screw integral with it.

According to one embodiment, the pitch of the screw varies according to the length of the screw.

According to one embodiment, the screw exhibits a stirrer positioned at the end of the screw.

According to one embodiment, the force-feeding screw is guided in rotation by at least two centring arms integral with the stirrer.

According to one embodiment, the stirrer is equipped with a deflector facing the outlet of the first pipe.

According to one embodiment, the stirrer exhibits a shaft positioned at its end.

According to one embodiment, the stirrer is guided in rotation by bearings integral with the receptacle.

According to one embodiment, the pipes are vertical.

According to one embodiment, the inlet of the second pipe exhibits a conical shape corresponding at least partially to the force-feeding screw.

According to one embodiment, the second pipe has a shape and structure appropriate for milling.

According to one embodiment, the force-feeding screw has a shape and structure appropriate for milling.

A further subject matter of the invention is a process for the calcining of gypsum, comprising the stages of:
  (i) supplying hot gases to the inlet of a first pipe;
  (ii) supplying gypsum to the inlet of a second pipe concentric with the first pipe;
  (iii) carrying the gypsum along in the second pipe via a force-feeding screw;
  (iv) indirect heat exchange between the gypsum and the hot gases; and
  (v) calcining the gypsum to plaster.

According to one embodiment, the gypsum is gypsum from flue gas desulphurization and/or natural gypsum.

According to one embodiment, the stages (iii) of carrying the gypsum along and (iv) of indirect heat exchange comprise the drying of the gypsum.

According to one embodiment, the stages (iii) of carrying the gypsum along and (iv) of indirect heat exchange comprise the drying and at least partially the calcining (v) of the gypsum to plaster.

According to one embodiment, the calcining (v) comprising bringing the gypsum into contact with the hot gases, the calcining being of the flash type.

According to one embodiment, the time between bringing the gypsum into contact and its complete calcining is less than 10 sec.

According to one embodiment, the calcining (v) comprises bringing the gypsum into contact with the hot gases, the calcining being carried out in a fluidized bed.

According to one embodiment, the calcining stage comprises transportation of the gypsum from the outlet of the second pipe by entertainment by hot gases.

According to one embodiment, the residence time of the gypsum and/or plaster in the second pipe is between 30 seconds and 5 minutes.

According to one embodiment, the stage of indirect heat exchange between the gypsum and the hot gases comprises the calcining stage.

According to one embodiment, the stages (iii) of carrying the gypsum along and (iv) of indirect heat exchange comprise the drying and at least partially the calcining (v) of the gypsum to plaster, the calcining (v) being completed by bringing the gypsum into contact with the hot gases, the completed calcining being of the flash type, the duration of the stages (iii) and (iv) being between 30 seconds and 5 minutes and the duration of the calcining by contact with the hot gases being between 1 and 10 seconds.

According to another embodiment, the duration of the stages (iii) and (iv) is between 1 and 2 minutes and the duration of the calcining by contact with the hot gases is between 2 and 5 seconds.

According to one embodiment, the process according to the invention additionally comprises a stage (iiib) of milling the gypsum during the stage (iii) of carrying along.

According to one embodiment, the process is carried out in the dryer/calciner according to the invention.

A further subject matter of the invention is a plaster capable of being obtained by the process according to the invention. This plaster additionally exhibits specific characteristics which will be described below.

BRIEF DESCRIPTION OF THE DRAWINGS

Other characteristics and advantages of the invention will become apparent on reading the description which follows of the embodiments of the invention which are given by way of example and with reference to the drawings, which show:

FIG. 1: a transverse cross-sectional view of a drying and calcining plant according to a first embodiment of the invention;

FIG. 2: a diagrammatic representation of an example of a screw which can be used in the plant of FIG. 1.

DETAILED DESCRIPTION OF THE PREFERRED EMBODIMENTS

The invention proposes to make available a force-feeding screw in a pipe for feeding with gypsum. This pipe is concentric with another pipe acting as combustion chamber of the burner and as pipe for introducing hot gases. The hot gas pipe can therefore be the internal pipe or the external pipe; the description which follows is given for the case where the hot gas pipe is the internal pipe but the invention applies mutatis mutandis to the case where the hot gas pipe is the external pipe.

The combustion gases heat the gypsum of the external pipe in order to dry it and optionally to partially or completely dehydrate it (i.e., calcine it).

The combustion gases subsequently come into contact with the material in order to completely or partially carry out the calcining.

FIG. 1 represents a transverse cross-sectional view of a dryer/calciner 1 according to a first embodiment of the invention. This dryer/calciner has a receptacle 2a designed to hold calcium sulphate dihydrate to be calcined (or to be continued to be calcined).

A burner 3 is positioned in the top part of the reactor, the outlet of the burner 3 being placed in a first pipe 4 for transfer of hot gases. The first pipe 4 emerges approximately at the bottom of the receptacle 2a. A second pipe 5 surrounds the first pipe 4. A force-feeding screw 6 is positioned between the two pipes 4 and 5. This screw 6 is driven in rotation by a motor 7 using appropriate transmission. The shape and the dimensions of this screw are adjusted and calculated precisely to ensure good flow of the gypsum and high thermal efficiency. An inlet for calcium sulphate dihydrate emerges in the space between the pipes 4 and 5. The dryer/calciner is thus fed by a source of calcium sulphate dihydrate. Appropriate devices are positioned to ensure the leaktightness of the receptacle with the exterior.

Appropriate burners, for example with a relatively long flame, as described in the state of the art, can be used. The burner generates hot gases, used both to dry the gypsum (evaporation of the moisture or free water present in the gypsum) and to convert the calcium sulphate dihydrate of the dried gypsum to calcium sulphate hemihydrate or plaster, that is to say to calcine it.

The hot gases pass through a pipe 4, preferably positioned vertically in the reactor. The pipe 4 extends from the burner as far as substantially the foot of the receptacle. The hot gases passing through the pipe are thus introduced approximately at the level of the bottom of the receptacle 2a. Of course, it is possible to introduce the hot gases at any appropriate point of the reactor to calcine the calcium sulphate dihydrate. It is also possible to plan to use a pipe which is sloping with respect to the vertical of the dryer/calciner.

The external pipe 5 surrounds the internal pipe 4, these pipes being positioned preferably vertically in the receptacle. This external pipe 5, and the force-feeding screw 6, make it possible to guide the gypsum from the inlet 8 as far as into the receptacle.

The gypsum passing through the pipe 5 absorbs heat from the gases passing through the pipe 4. Heat exchanges between the gas of the internal pipe 4 and the gypsum of the external pipe 5 make it possible to ensure evaporation of the free moisture of the gypsum before it comes into direct contact with the combustion gases. The concentric arrangement of the external pipe 5 and of the internal pipe 4 makes it possible to carry out efficient heat exchange between the gypsum and the hot gases. Convection, radiation and in particular conduction phenomena make this heat exchange possible. The force-feeding screw performs this role partly by the fact that it is preferably welded to the pipe 4, which thus forms its axis, and also by the dimensioning of the blades, providing a high surface area for contact with the gypsum.

The moisture is discharged via the discharge pipe 13, preferably positioned in the top part of the receptacle, a space being inserted for this purpose between the top part of the pipe 5 at the base of the inlet 8 and the discharge pipe 13. It is also possible to provide a pipe 13a (not represented) situated in this inserted space, it being possible for this pipe 13a, if necessary, to discharge all or part of the water vapour or, on the contrary, to be used for additional injection of water vapour (or of any other gas, if need be).

These heat exchanges make it possible not only to dry the gypsum but possibly to begin the reaction for the conversion of the calcium dihydrate to hemihydrate. Thus, the dryer/calciner exhibits a space 2 for calcining gypsum which is capable of beginning even inside the external pipe 5, to subsequently spread into the receptacle 2a and possibly into the pipes at the outlet of the reactor.

The force-feeding screw 6 is positioned between the pipes 4 and 5. This screw is driven in rotation by the motor 7, preferably via the pipe 4 integral with it. The screw makes it possible to feed the gypsum into the external pipe 5. This screw extends from a gypsum guiding inlet 16 of the external pipe 5 which exhibits a conical shape, the screw being able to match the shape of the inlet. The screw also makes it possible to avoid clogging the pipe 5 with the gypsum, either by the effect of carrying the gypsum along or by scraping the blades of the screw inside the external pipe 5. The screw also homogenises the fresh material by mixing the latter. The difference in temperature between the fresh material close to the internal pipe 4 and the fresh material close to the external pipe 5 is thus reduced, which further improves the evaporation of the free moisture. This is advantageous when the material comprises gypsum from flue gas desulphurization, this product exhibiting a particularly high level of free moisture. The speed of rotation of the screw is adjusted according to the throughput chosen. The water vapour produced is discharged via the top of the system. The dryer/calciner according to the invention prevents clogging of gypsum, in particular of wet gypsum from flue gas desulphurization, during the handling operations. Furthermore, a gap is preferably provided between the screw 6 and the pipe 5.

At the end of the internal pipe 4, the combustion gases come into contact with the material. Because of the heat exchanges already mentioned, the temperature of the combustion gases is reduced when they reach the end of the pipe 4 and come into contact with the material. It is thus possible to calcine (or terminate the calcining of) the material exiting from the external pipe 5 with a suitable gas temperature, for example between 300 and 600° C. The formation of undesired derivatives, such as anhydrite II, during the calcining is thus avoided.

The characteristic dimensions of the calciner according to the invention are, for example (for a capacity of 5 t/h):
Height of the reactor: 2 500 mm
Diameter of the reactor: 2 100 mm
Diameter of the lower base of the external tube: 700 mm
Diameter of the upper base of the external tube: 1 710 mm
Diameter of the internal tube: 500 mm.

These dimensions are also compatible with transportation in a maritime container, which facilitates the transportation of the unit, in particular over long distances.

According to a dryer/calciner alternative form, the pipe 5 can be designed to surround the pipe 4 over a portion of its length or over its entire length.

The force-feeding screw exhibits, for example, a length of between 70% and 90% of the total height of the reactor. The screw exhibits one or more blades extending radially as a helix. In the example of the figure, the screw comprises a single blade, the length of which is substantially equal to the length of the internal pipe 4. When the pipe 4 begins at a higher level (in particular when the top part of the pipe acts as combustion chamber), the length of the screw may be only partially that of the said pipe 4 (for example 80%). Preferably, the screw 6 has a length substantially equal to that of the external pipe 5. This blade is preferably made of metal (e.g. stainless steel) or with a material exhibiting good thermal conductivity.

The force-feeding screw is advantageously integral with the internal pipe 4 for the combustion gases. It is possible, for example, to use the pipe 4 as transmission shaft for the force-feeding screw 6. The force-feeding screw 6 can also have a stirrer/centring device 11. This stirrer is, for example, attached to the bottom end of the pipe 4 when the screw is integral with the latter (but the screw might be integral with the pipe 5, or independent of both pipes, and the like). This stirrer/centring device acts as centring device for the screw in the pipe 5.

In this alternative form, the pipe 4 is then emplaced so as to rotate with respect to the receptacle 2a. This alternative form thus makes it possible to obtain a force-feeding screw which is simpler to manufacture. The thermal conduction between the hot gases and the gypsum in the external pipe 5 is also improved by the screw.

FIG. 2 gives an implementational example of the force-feeding screw 6. A bar, for example of cruciform cross section 15, is present to transmit the torque of the pipe 4 to the stirrer/centring device 11. The latter can optionally comprise several blades which move, if appropriate, a bed which may be present or a deposit of material placed at the bottom of the reactor. The stirrer makes it possible, according to the type of calcining carried out in the dryer/calciner, to homogenize the material of the bed and to distribute the material originating from the pipe 5 in the bed, or to discharge possible deposits by conveying them into a stream of combustion gases. This stirrer also makes it possible to facilitate the emptying of the reactor when needed (represented by 17 in FIG. 1).

The force-feeding screw 6 can also be designed to exhibit two (or more) blades as helices which fit into one another.

The blade or blades can also be designed to exhibit a pitch towards the outlet of the pipes which is smaller than towards the feed inlet, as represented in the example of FIG. 2. A variable pitch makes it possible to easily obtain a stopper effect at the end of the screw, the hot gases therefore not being able to rise into the material inside the pipe 5.

A screw which is conical over substantially its length can also be provided, in which case a variation in the pitch is not required. It is also possible to have a screw with a constant pitch, indeed even an increasing pitch, if appropriate.

The stirrer/centring device 11 can have a deflector (represented in FIG. 1) 12 to improve the aeraulics. This deflector is placed facing the outlet of the pipe 4 for hot gases.

According to an alternative form, the gases, which may be loaded, discharged via the outlet 13 are subsequently recycled. They can thus pass into a cyclone or a filter 14, which separates the dust from the gases discharged. Provision may also be made to recycle the gases discharged via the outlet 9. The residual gases are subsequently carried to the combustion chamber of the burner, thus increasing the thermal efficiency of the dryer/calciner.

Depending on the type of calcining system chosen, the particles of hemihydrate (plaster) can be collected at the foot of the calciner (in the case of emptying via the pipe 17), in the gases exiting via the pipe 13, or via a side outlet 9 at the level of the top part of a fluidized bed 10 which may be formed. The calcining will be described in more detail below.

Three calcining methods can generally be distinguished, the calcining being described in more detail below.

According to the first operating method, the gypsum is fully calcined by direct contact with the combustion gases, only the drying taking place by indirect contact with the hot gases in the space between the pipes 4 and 5. The space 2 for calcining gypsum then extends from the outlet of the space situated between the pipes 4 and 5 and comprises the receptacle 2a (in this instance coincident with the reactor). "Flash"

calcining preferably takes place at the outlet of the pipe 5. Conventional calcining can also be carried out in a bed, as in the above mentioned prior art. According to the temperatures of the gases at the outlet, the calcining can optionally be terminated after the outlet of the receptacle 2a, particularly in the pipes as far as the filter, provided that the temperature is sufficiently high. What is referred to as post-calcining (interaction between hot and wet gases and the material in the course of cooling) may possibly occur. It has also been found, generally, that the shorter the calcining time, the greater the reactivity of the calcium sulphate hemihydrate or plaster obtained. It was found in practice that the reactivity of the hemihydrate obtained increases with its rate of calcining. It is therefore particularly advantageous to carry out the calcining immediately after the drying in the form of flash calcining.

According to a second operating method, the calcining is already partially carried out in the pipe 5 and the calcining is continued in the receptacle 2a. The calcining zone 2 then comprises a portion of the space situated between the pipes 4 and 5 and the receptacle 2a. As for the first operating method, the calcining can also be terminated after the outlet of the receptacle 2a and likewise flash calcining is also preferred.

The calcining is generally carried out according to the second method. The calcining at the outlet of the pipe 5 is generally between 20 and 70%, preferably 30 to 60%, advantageously approximately 50%.

This second operating method is obtained, for example, with the following times for transfer of the material: a cycle for transfer or for drying in the external pipe 5 of between 30 seconds and 5 minutes, preferably between 1 and 2 minutes; a cycle for calcining by contact of the material and combustion gases of between 1 and 10 seconds, preferably between 2 and 5 seconds.

This second operating method is obtained, for example, by using the calciner described above with a screw rotating at a rate of between 2 and 12 revolutions/minute, a synthetic gypsum with a particle size of 50 µm, such as gypsum from flue gas desulphurization, and a calorific power of 1.5 to 2.0 MW.

According to a third method of operating the dryer/calciner, the calcining space is coincident with the space situated between the pipes 4 and 5 (i.e. the inside of the external pipe 5). In this case, all the gypsum is calcined before its departure from the external pipe 5. In this case, no receptacle 2a is required and the latter can be omitted.

The distinction between the three operating methods is controlled by several factors, related to the device itself, to the operating conditions (thermal power and throughput) and to the characteristics of the gypsum.

When synthetic gypsum is treated, the latter exhibits a very fine particle size (a mean diameter of a few tens of microns). It will generally be possible to dry and partially dehydrate in the space between the two tubes (second operating method). The degree of dehydration can vary according to the throughput of gypsum and the power of the burner. At the pipe outlet, the remainder of the calcining preferably takes place in the "flash" way in a few seconds (2 to 10 sec, for example). The material is then entrained in the stream of the combustion gases to the filter, where it is recovered.

When a milled natural gypsum is treated, the latter exhibits a relatively fine particle size (a mean diameter of up to a few hundred microns). It will generally be possible to dry in the force-feeding screw, this type of gypsum (natural) not exhibiting a high moisture content. The degree of calcining at the outlet of the screw is also variable. In the case of a low degree, aeraulic conditions will be chosen (see below) so as to form a fluidized bed 10, the discharge of the plaster taking place via the top outlet 9. In the case of a high degree, aeraulic conditions will be chosen (see below) so to form a fluidized bed 10 only over a very low height, the discharge of the plaster taking place via a bottom outlet which is virtually coincident with the emptying outlet 17. In this case, there is no flash calcining, the residence time of the material in the bed being greater than a few tens of seconds. The position of the outlet depends on the degree of calcining at the screw outlet.

In the case of natural-gypsum, it is possible to make provision for an advantageous embodiment. According to this embodiment, the device according to the invention provides a milling role starting from a crushed natural gypsum (having a particle diameter typically of 3 mm). According to this embodiment, the second pipe and/or the force-feeding screw has (have) a shape and structure appropriate for milling. This is because it is possible to choose abrasive surfaces and to adjust the gaps between the components so as to obtain attrition conditions, thus making it possible to mill the crushed natural gypsum to particles having a diameter, for example, between 50 and 500 µm. In general, in the device, the milling role is provided after the drying role.

The conditions (aeraulic, thermal and other) prevailing in the receptacle 2a are a function in particular of the particulate size of the dried and more or less dehydrated gypsum exiting from the pipe 5 and of the velocity of the gases (when empty) in the receptacle. Nomograms are known which will give, at a given temperature and a given moisture content, the transportation conditions under which the material will be found.

There are two scenarios. In the first scenario, the particles are entrained by the hot gases. The phenomenon of transportation of the solids by gases occurs. In this case, the plaster is recovered after separation of the gases, for example in the cyclone 14 (any other type of separator commonly used can be used). In such a case, the calorific power of the burner and the flow rates of the hot gases thus produced can be adjusted in order for flash calcining to take place in a short time. This embodiment is preferred, in particular for producing a plaster which will be used for the manufacture of plaster boards. In the second scenario, the particles sediment and then form a fluidized bed. In such a case, the plaster can be discharged in the receptacle 2a at a more or less high level via the outlet 9, which can, under extreme conditions, be coincident with the emptying outlet 17.

In the case of flash calcining, the receptacle 2a acts mainly as pipe for guiding the hemihydrate obtained. The receptacle can then have any appropriate shape and not necessarily a cylindrical shape, as was the case for the calciners of the prior art. In the case of calcining with a bed of material, the receptacle 2a fulfils its conventional role.

The process according to the invention offers yet further advantages with respect to the prior art. It is a continuous and very stable process (the quality of the plaster produced is uniform). The thermal and aeraulic equilibria are very rapidly obtained (typically in less than 15 minutes), which leads to simplicity of operation. Finally, the device employing the process according to the invention is compact and simple, which offers reduced capital costs.

It is possible in the invention (in particular with a calcining method employing flash calcining) to obtain a plaster having the following properties.

This plaster is particularly well suited to the manufacture of plaster boards, of precast plaster slabs, of "industrial" plaster or of coatings.

The plaster according to the invention exhibits highly specific characteristics with respect to plasters known in the prior art. These characteristics are as follows:

(i) Very reactive plaster, with a very high rate of setting.
(ii) The water demand of this plaster is low.
(iii) The fluidity of the plaster is excellent.

The rate of setting is measured in various ways.

According to a first alternative form, the Gillmore initial set is between 4.5 and 6 min. The ASTM C266 standard is used for this measurement.

According to a second alternative form, the Vicat final set is between 10 and 12 min. The ASTM C472 standard is used for this measurement.

According to a third alternative form, which is preferred, the knife initial set is less than 6 minutes, preferably less than 5 minutes. The NF B 12-401 or ISO DIN 3050 standard (Smidth ring: internal diameter 60 mm, height 50 mm) is used for the determination. Inasmuch as it is a fast-setting plaster, the process is modified, in accordance with the recommendations for fast-setting plasters, as follows: after sprinkling the plaster into water for 15 sec and waiting 30 sec for impregnation of the powder, the mixture is stirred for 30 sec before filling the Smidth ring, and the ring is removed at 1 min 15 sec for the measurement of the knife set.

The water demand is related in particular to the plaster/water ratio at saturation. It is greater than 140 parts of plaster per 100 parts of water. The NF B 12-401 or ISO DIN 3050 standard is used for the determination. By way of comparison, a conventional plaster has a plaster/water ratio at saturation of the order of 125 parts of plaster per 100 parts of water.

The fluidity is excellent (which is also related to the water demand). It is measured by the spreading, for a plaster/water ratio of 0.75, of at least 205 mm, preferably at least 240 mm. These values are, surprisingly, fairly high, when the plaster is obtained by a flash calcining. This is because the flash calcining plasters according to the prior art are characterized by a very mediocre fluidity, which requires a great deal in the way of adjuvants. The NF B 12-401 or ISO DIN 3050 standard (Smidth ring: internal diameter 60 mm, height 50 mm) is applied. After sprinkling the plaster into water for 15 sec and waiting 30 sec for impregnation of the powder, the mixture is stirred for 30 sec before filling the Smidth ring, and the ring is removed at 1 min 15 sec for the measurement of the spreading.

The plaster according to the invention does not split in water. The BET surface area (NF X 11-621 standard) of the plaster according to the invention is generally greater than 8 $m^2/g$. Such a value does not correspond to the usual characteristics of a plaster which does not split in water (for example, an aged plaster exhibits a BET surface area of less than 4 $m^2/g$, generally, and does not split in water). Reference may be made, for the determination of the splitting in water, to the publication "Eclatement des grains de platre au contact de l'eau" [Splitting of plaster grains on contact with water], Jean-Claude Weiler, in Ciments, Bétons, Plâtres, Chaux, No. 744, 5/88. The splitting capability of the plaster according to the invention, using the definition given in this publication, is typically less than 5%.

The characteristics of the plaster according to the invention make it possible to obtain advantageous properties.

The low setting time makes it possible to avoid the addition of setting accelerator, such as gypsum (which can be calcining residual gypsum or added raw gypsum). Thus, the plaster according to the invention is devoid of gypsum (the gypsum content is typically less than 0.4%, indeed even 0.2%, by weight).

The low water demand (plaster/water ratio at saturation and fluidity) makes it possible to add less water for the manufacture of the plaster slurry for a given consistency. This is advantageous, since it is necessary, in a plant for plaster boards, or for slabs, for example, to dry the excess mixing water. Savings in capital costs and in energy consumption are thus achieved. The low water demand also makes it possible to obtain final products (industrial plaster or plasterboard) which are very hard and/or with a high mechanical strength.

The process according to the invention has been implemented and, for parameters coming within the specified ranges, plasters have been obtained with the following characteristics. Example 4 is a conventional plaster.

| Ex. | D50 | Knife initial set | Spreading (mm) | Splitting (% at 50 μm) | BET $m^2/g$ | Plaster/water ratio at saturation |
|---|---|---|---|---|---|---|
| 1 | 35 μm | 4 min 15 sec | 242 | 0% | 9.5 | 161 |
| 2 | 40 μm | 5 min 15 sec | 258 | 0% | 10.1 | 160 |
| 3 | 40 μm | 5 min 15 sec | 241 | 1% | 10.2 | 170 |
| 4 | 35 μm | 10-20 min | 195 | 65% | 10.8 | 125 |

Of course, the present invention is not limited to the examples and embodiments described and represented but it is capable of numerous alternative forms accessible to a person skilled in the art. Thus, although a pipe 5 for feeding with fresh calcium sulphate dihydrate has been described above which surrounds the pipe for feeding with hot gases 4, the pipe for feeding with hot gases 4 can also be designed, in the context of the invention, to surround the pipe 5 for feeding with fresh calcium sulphate dihydrate. The invention will also be found to apply generally to any pulverulent product which has to be dried and/or calcined.

The invention claimed is:

1. A process for the calcining of gypsum, in a gypsum dryer/calciner comprising:
    a calcining space;
    a first pipe having an inlet connected to a source of hot gas and an outlet emerging in the calcining space;
    a second pipe having an inlet connected to a source of gypsum and an outlet emerging in the calcining space, the second pipe being concentric with the first pipe;
    a force-feeding screw positioned at least partially in the second pipe, the screw carrying the gypsum along in the calcining space;
    the process comprising the stages of:
        (i) supplying hot gases to the inlet of a first pipe;
        (ii) supplying gypsum to the inlet of a second pipe concentric with the first pipe;
        (iii) carrying the gypsum along in the second pipe via a force-feeding screw;
        (iv) indirect heat exchange between the gypsum and the hot gases; and
        (v) calcining the gypsum to plaster.

2. The process according to claim 1, wherein the gypsum is gypsum from flue gas desulphurization or natural gypsum or a mixture thereof.

3. The process according to claim 1, wherein the stages (iii) of carrying the gypsum along and (iv) of indirect heat exchange comprise drying of the gypsum.

4. The process according to claim 1, wherein the stages (iii) of carrying the gypsum along and (iv) of indirect heat exchange comprise drying and at least partially the calcining (v) of the gypsum to plaster.

5. The process according to claim 1, wherein the calcining (v) comprises bringing the gypsum into contact with the hot gases, and wherein the calcining is a flash calcination.

6. The process according to claim 1, wherein the time between bringing the gypsum into contact and its complete calcining is less than 10 sec.

7. The process according to claim 1, wherein the calcining (v) comprises bringing the gypsum into contact with the hot gases, the calcining being carried out in a fluidized bed.

8. The process according to claim 1, wherein the calcining stage comprises transportation of the gypsum from the outlet of the second pipe by entertainment by hot gases.

9. The process according to claim 1, wherein the residence time of the gypsum or plaster or a mixture thereof in the second pipe is between 30 seconds and 5 minutes.

10. The process according to claim 1, wherein the stage of indirect heat exchange between the gypsum and the hot gases comprises the calcining stage.

11. The process according to claim 1, wherein the stages (iii) of carrying the gypsum along and (iv) of indirect heat exchange comprise the drying and at least partially the calcining (v) of the gypsum to plaster, the calcining (v) being completed by bringing the gypsum into contact with the hot gases, wherein the completed calcining is a flash calcination, the duration of the stages (iii) and (iv) being between 30 seconds and 5 minutes and the duration of the calcining by contact with the hot gases being between 1 and 10 seconds.

12. The process according to claim 11, the duration of the stages (iii) and (iv) being between 1 and 2 minutes and the duration of the calcining by contact with the hot gases being between 2 and 5 seconds.

13. The process according to claim 11, additionally comprising a stage (iiib) of milling the gypsum during the stage (iii) of carrying along.

14. A process for the calcining of gypsum, in a gypsum dryer/calciner comprising:
   a calcining space;
   a first pipe having an inlet connected to a source of hot gas and an outlet emerging in the calcining space;
   a second pipe having an inlet connected to a source of gypsum and an outlet emerging in the calcining space, the second pipe being concentric with the first pipe;
   a force-feeding screw positioned at least partially in the second pipe, the screw carrying the gypsum alone in the calcining space;
   the process comprising the stages of:
   (i) supplying hot gases to the inlet of a first pipe;
   (ii) supplying gypsum to the inlet of a second pipe concentric with the first pipe;
   (iii) carrying the gypsum along in the second pipe via a force-feeding screw;
   (iv) indirect heat exchange between the gypsum and the hot gases; and
   (v) calcining the gypsum to plaster, by bringing the gypsum into contact with the hot gases, wherein the calcining is a flash calcination.

15. The process according to claim 14, wherein the time between bringing the gypsum into contact and its complete calcining is less than 10 sec.

16. A process for the calcining of gypsum, in a gypsum dryer/calciner comprising:
   a calcining space;
   a first pipe having an inlet connected to a source of hot gas and an outlet emerging in the calcining space;
   a second pipe having an inlet connected to a source of gypsum and an outlet emerging in the calcining space, the second pipe being concentric with the first pipe;
   a force-feeding screw positioned at least partially in the second pipe, the screw carrying the gypsum along in the calcining space;
   the process comprising the stages of:
   (i) supplying hot gases to the inlet of a first pipe;
   (ii) supplying gypsum to the inlet of a second pipe concentric with the first pipe;
   (iii) carrying the gypsum along in the second pipe via a force-feeding screw
   (iv) indirect heat exchange between the gypsum and the hot gases; and
   (v) calcining the gypsum to plaster;
   wherein the stages (iii) of carrying the gypsum along and (iv) of indirect heat exchange comprise the drying and at least partially the calcining (v) of the gypsum to plaster, the calcining (v) being completed by bringing the gypsum into contact with the hot gases, wherein the completed calcining is a flash calcination, the duration of the stages (iii) and (iv) being between 30 seconds and 5 minutes and the duration of the calcining by contact with the hot gases being between 1 and 10 seconds.

17. The process according to claim 16, the duration of the stages (iii) and (iv) being between 1 and 2 minutes and the duration of the calcining by contact with the hot gases being between 2 and 5 seconds.

* * * * *

UNITED STATES PATENT AND TRADEMARK OFFICE
CERTIFICATE OF CORRECTION

| | | |
|---|---|---|
| PATENT NO. | : 7,651,565 B2 | Page 1 of 1 |
| APPLICATION NO. | : 10/506567 | |
| DATED | : January 26, 2010 | |
| INVENTOR(S) | : Charles Falinower | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Twenty-third Day of November, 2010

David J. Kappos
*Director of the United States Patent and Trademark Office*